2,798,874
3-(MONOCARBOCYCLIC ARYL-LOWER-ALKYL)-1,5-IMINO-CYCLOALKANES AND PREPARATION THEREOF

Sydney Archer, Albany, N. Y., assignor to Sterling Drug Inc., New York, N. Y., a corporation of Delaware No Drawing. Application April 20, 1955,
Serial No. 502,745

27 Claims. (Cl. 260—292)

The inventive contribution herein described is a novel group of chemical compounds consisting of (A) cycloalkanes having an N-substituted 1,5 imino bridge and a (monocarbocyclic aryl-lower-alkyl)amino group attached to the 3-position of the cycloalkane ring, (B) acid-addition salts, and (C) quaternary ammonium salts thereof; and, the procedure whereby this is accomplished. Such compounds can be obtained by the attachment of a 1,5-imino N-substituted cycloalkane at the 3-position thereof of a (monocarbocyclic aryl-lower-alkyl)amino group, and the invention also relates to a procedure whereby this is accomplished.

The cycloalkane above is preferably cycloheptane or cyclooctane and among the substituents on the nitrogen atom of the 1,5-imino bridge are hydrocarbon radicals or such radicals bearing substituents such as halo, alkyl, alkoxy, etc. The said radical preferably has from one to about ten carbon atoms.

A preferred form of the invention consists of substituted tropanes and granatanines and salts thereof, said tropanes and granatanines having the general formula:

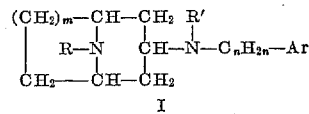

I wherein Ar represents a monocarboxylic aryl group, R represents a lower-alkyl, monocarbocyclic aryl or a monocarbocyclic aryl-lower-alkyl group, R' represents hydrogen or a lower-alkyl group, $m$ represents the integers 1 and 2 and $n$ is an integer from 1 to 6, inclusive.

Pharmacological evaluation of the compounds of the invention by the standard carotid occlusion response in dogs and cats has shown that these substances have ganglionic blocking effects and indicate usefulness for the compounds in the field of reducing hypertension. The quaternary ammonium salts are particularly potent ganglionic blocking agents, although the free bases and acid-addition salts also possess ganglionic blocking action but larger doses are required than for the quaternary ammonium salts.

In the above general Formula I the grouping $C_nH_{2n}$ represents a lower-alkylene radical having from one to six carbon atoms. The lower-alkylene radicals are straight or branched and include such radicals as methylene, —CH₂—
ethylene, —CH₂CH₂—
1,3-propylene, —CH₂CH₂CH₂—
1,2-propylene, —CH(CH₃)CH₂—
1,4-butylene, —CH₂CH₂CH₂CH₂—
1,5-pentylene, —CH₂CH₂CH₂CH₂CH₂—
1,6-hexylene, —CH₂CH₂CH₂CH₂CH₂CH₂—
1,2-dimethylethylene, —CH(CH₃)CH(CH₃)— and the like. A preferred subgroup of compounds are those in which $n$ is equal to 1, so that the lower-alkylene radical $C_nH_{2n}$ is the methylene group.

In the above general Formula I Ar represents a monocarboxylic aryl group and thus stands for a radical of the benzene series and includes such groups as phenyl and phenyl substituted by substituents inert under the conditions used in the preparation of the compounds. Such inert substituents include lower-alkyl, lower-alkoxy, halogen, trifluoromethyl, di-lower-alkylamino, and the like. A preferred group of aryl radicals comprises unsubstituted phenyl and phenyl substituted by from 1 to 3 lower-alkyl, lower-alkoxy, halogen or di-lower-alkylamino radicals, in which the lower-alkyl and lower alkoxy radicals have from one to six carbon atoms, and halogen is selected from fluorine, chlorine, bromine and iodine. If more than one substituent is present in the phenyl ring they can be the same or different.

In the above general Formula I the group R represents a hydrocarbon radical or such a radical bearing inert substituents such as halo, alkyl, alkoxy and the like. A preferred class of the group R comprises lower-alkyl, monocarbocyclic aryl, and monocarbocyclic aryl-lower-alkyl groups. The lower-alkyl groups can be straight or branched and contain from one to about six carbon atoms. The monocarbocyclic aryl groups are of the same type as defined above for the group Ar. Accordingly R represents such groups as methyl, ethyl, propyl, isopropyl, butyl, isobutyl, tertiary-butyl, pentyl, hexyl, benzyl, 2-phenylethyl, 3-phenylpropyl, p-chlorobenzyl, m-methoxybenzyl, p-methylbenzyl, phenyl, o-bromophenyl, p-ethoxyphenyl, p-tolyl, and the like.

In the above general Formula I the group R' represents hydrogen or a lower-alkyl group having from one to about six carbon atoms. When R' is a lower-alkyl group it may be straight or branched and thus includes such groups as methyl, ethyl, propyl, isopropyl, butyl, isobutyl, pentyl, hexyl, and the like.

In the above general Formula I the compounds where $m$ is 1 belong to the tropane series whereas the compounds where $m$ is 2 belong to the granatanine series. In these compounds there is a possibility of stereoisomerism depending upon whether the side chain, $N(R')C_nH_{2n}Ar$, is on the same side or the opposite side of the molecule as the substituent R. In compounds of the tropane series, such stereoisomers are known as tropanes and pseudo-tropanes, respectively.

The 1,5-iminocycloalkanes of the invention wherein a (monocarbocyclic aryl-lower-alkyl)amino group is attached to the 3-position of the cycloalkane ring, are prepared by condensing an N-substituted 1,5-iminocycloalkane-3-one with a (monocarbocyclic aryl-lower-alkyl)-amine, and reducing the resulting imine by catalytic hydrogenation or by other means, for example, with sodium in the presence of a lower-alkanol.

The compounds of Formula I wherein R' is H can be prepared by condensation of a compound having the formula

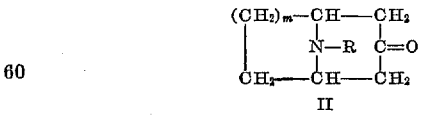

II with a monocarbocyclic aryl-lower-alkylamine,

under catalytic hydrogenation conditions. The condensation and reduction take place at room temperature, although heat may be applied if desired. It is convenient to employ a liquid organic reduction medium, such as ethyl alcohol, which is unreactive with the compound II and the arylalkylamine and is not subject to catalytic hydrogenation. Exemplary of the arylalkylamines which can be used in the reaction are benzylamine, H₂NCH₂C₆H₅
2-phenethylamine, H₂NCH₂CH₂C₆H₅
3-phenylpropylamine, H₂NCH₂CH₂CH₂C₆H₅
2-phenylpropylamine, H₂NCH₂CH(CH₃)C₆H₅
p-chlorobenzylamine, H₂NCH₂C₆H₄Cl-p
o-methoxybenzylamine, H₂NCH₂C₆H₄OCH₃-o
p-methylbenzylamine, H₂NCH₂C₆H₄CH₃-p
p-dimethylaminobenzylamine,
  H₂NCH₂C₆H₄N(CH₃)₂-p and the like.

The compounds of Formula II are readily prepared by the classic Robinson synthesis, i. e., condensation of succindialdehyde or glutaric dialdehyde with a primary amine and an acetone dicarboxylic acid ester, followed by hydrolysis and decarboxylation, according to the following equation:

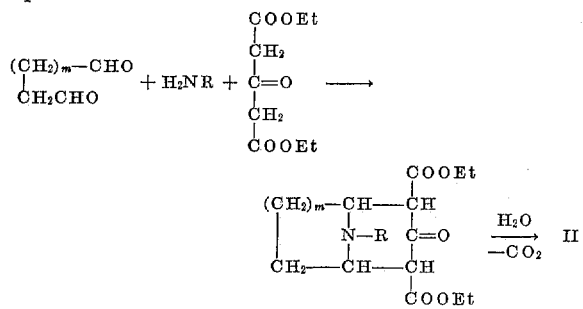

The succindialdehyde ($m=1$) is conveniently prepared in situ by acid treatment of 2,5-diethoxytetrahydrofuran. The glutaric dialdehyde ($m=2$) is conveniently prepared in situ by heating glutaric dialdehyde dioxime with sodium nitrite in hydrochloric acid.

The compounds of Formula I where R' is H can also be prepared by condensation of a compound of Formula II with an arylalkylamine, H₂NC$_n$H$_{2n}$Ar, in the presence of a dehydrating agent, such as zinc chloride, to give an unsaturated intermediate of the structure

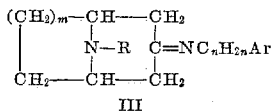

followed by reduction of the latter either catalytically or chemically, for example, by means of sodium in the presence of a lower-alkanol. Catalytic hydrogenation gives substantially exclusively one stereoisomer, belonging to or analogous to the normal tropane series. Sodium in alcohol reduction, however, usually yields a mixture of stereoisomers.

The compounds of Formula I wherein R' is a lower-alkyl group are produced by acylation of the compounds wherein R' is H by reacting the latter with the appropriate acid, acid anhydride or acid halide, followed by reduction of the intermediate amide with lithium aluminum hydride. In the reduction the carbonyl group of the amide linkage is converted to a methylene group; thus a formyl group is reduced to a methyl group, an acetyl group to an ethyl group, and so forth.

An alternative method for preparing compounds of Formula I wherein R' is methyl comprises reacting the corresponding compounds wherein R' is hydrogen with formaldehyde and formic acid. The reaction takes place readily at room temperature or below, although it is preferred to apply heat to the reaction mixture to bring about completion of the reaction.

Still another approach to the compounds of Formula I wherein R' is a lower-alkyl group comprises reacting a 3-lower-alkylaminotropane or -granatanine, for example, with a monocarbocyclic aryl-lower-alkyl halide, in the presence of an acid acceptor such as potassium carbonate.

In this reaction the aralkyl halide not only alkylates the secondary amino nitrogen but also quaternizes the tertiary-amino group of the 1,5-imino bridge, thus producing a quaternary ammonium salt directly. If less than two molar equivalents of aralkyl halide are used, a mixture of the free base and quaternary ammonium salt is obtained. The intermediate 3-lower-alkylaminotropane or -granatanine is prepared by condensing a 3-tropanone or pseudopelletierine with a lower-alkylamine under catalytic hydrogenation conditions analogous to the method described above for the preparation of the compounds of Formula I where R' is hydrogen.

The assigned structure of the compounds of Formula I wherein R is lower-alkyl was proved by the fact that catalytic hydrogenolysis of 3-(benzylmethylamino)tropane gave 3-methylaminotropane, identical with that obtained by condensation of 3-tropanone with methylamine under hydrogenation conditions.

The non-toxic acid-addition or quaternary ammonium salts of the compounds of Formula I are water-soluble and are the preferred form in which the compounds are useful physiologically. Non-toxic salts are salts whose anions are innocuous to the animal organism in therapeutic doses of the salts, so that beneficial physiological properties inherent in the free bases are not vitiated by side effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution. The number of equivalents of acid which enter into salt formation depends upon the amount of acid present and the number of amino groups present in the free base. If an excess of acid is used, the number of equivalents of acid entering into salt formation will be equal to the number of basic nitrogens present in the free base.

The quaternary ammonium salts are prepared by mixing the free base and the alkyl, alkenyl or aralkyl ester in an organic solvent. Heating may be used to facilitate the reaction, although salt formation usually takes place readily at room temperature. The quaternary ammonium salt separates directly or can be obtained by concentration of the solution. In most cases a monoquaternary ammonium salt is formed which is believed to involve the nitrogen atom of the 1,5-imino bridge, although under forcing conditions the nitrogen atom of the N(R') group can also be quaternized to give a bisquaternary ammonium salt.

The quaternary ammonium salts of the invention can be represented by the formula Z.R″X, wherein Z stands for an amine of formula I, R″ stands for a hydrocarbon radical or a hydrocarbon radical substituted by inert substituents, and X stands for an anion. Preferred types of the group R″ are those having from one to about ten carbon atoms selected from lower-alkyl, hydroxy-loweralkyl, lower-alkenyl, and monocarbocyclic aryl-lower-alkyl groups in which the aryl groups can be substituted by inert substituents such as lower-alkyl, lower-alkoxy, halo and nitro.

The quaternary ammonium salts are prepared by reacting the amine Z with a compound R″X wherein X is the anion of a strong acid. One quaternary ammonium salt can be converted to another in which the anion X is different. If the anion X of the quaternary salt forms a water-insoluble silver salt, the quaternary salt will react with silver oxide in aqueous medium to form the corresponding quaternary ammonium hydroxide. The latter can then be neutralized with any desired acid, weak or strong, to produce a new quaternary ammonium salt in which the anion is different from that of the original quaternary ammonium salt. In this way quaternary ammonium salts in which the anion X is derived from a weak acid can be obtained.

The following examples will further illustrate the invention without the latter being limited thereto.

*Example 1*

3-benzylaminotropane [I; R=CH$_3$, R′=H, Ar=C$_6$H$_5$, $n=1$, $m=1$].—A mixture of 45 g. of 3-tropanone, 32 g. of benzyl amine, 1.0 g. of platinum oxide catalyst and 150 ml. of ethanol was shaken in a hydrogen atmosphere at a pressure of 50 lbs. per sq. inch. After four hours at 55° C. one mole of hydrogen had been taken up, the reaction mixture was filtered, and the filtrate was concentrated. The residue was distilled, collecting the fraction boiling at 112–140° C. (0.9 mm.), and redistilled, giving 34.8 g. of 3-benzylaminotropane, B. P. 140–142° C. (0.8 mm.), $n_D^{25}=1.5450$.

A portion of the 3-benzylaminotropane was converted to the picrate by addition of an ethanol solution of the base to an ethanol solution of picric acid. The picrate which separated was collected by filtration and had the M. P. 160–161° C.

*Example 2*

3-(benzylmethylamino)tropane [I; R=CH$_3$, R′=CH$_3$, Ar=C$_6$H$_5$, $n=1$, $m=1$].—3-benzylaminotropane (29.6 g.) was cooled to 20° C. by means of a Dry Ice-acetone bath, and then 28.2 cc. of 98% formic acid was added portionwise followed by 13 cc. of 36% formaldehyde solution. The reaction mixture was allowed to warm to room temperature and then heated on a steam bath for seventeen hours. The reaction mixture was then poured into ice water, made basic with 35% sodium hydroxide solution and extracted with ether. The ether extracts were dried over anhydrous potassium carbonate and concentrated. The residue was distilled giving 21.2 g. of 3-(benzylmethylamino)tropane, B. P. 135–138° C. (0.3 mm.), $n_D^{25}=1.5416$.

The picrate of 3-(benzylmethylamino-tropane was prepared in alcohol solution and recrystallized from dimethylformamide. It had the M. P. 230–232° C.

Neut. equiv. calcd.: 351. Found 350.

*Example 3*

3-(benzylmethylamino)tropane methiodide.—A solution of 4.3 g. of 3-(benzylmethylamino)tropane and 3.5 ml. of methyl iodide in 30 ml. of ethanol was allowed to stand at room temperature for about fifteen hours. The solid product which separated was collected by filtration and recrystallized from methanol, giving 3-(benzylmethylamino)tropane methiodide, M. P. 233–237.5° C. (dec.).

Analysis calcd. for C$_{17}$H$_{27}$IN$_2$: N, 7.25; I, 32.84. Found: N, 7.26; I, 32.55.

*Example 4*

(a) 3-methylaminotropane was prepared by hydrogenation of 42 g. of 3-tropanone, 52.5 cc. of 5.82 N methylamine in methanol, and 1.5 g. of platinum oxide catalyst in 100 cc. of methanol according to the manipulative procedure described above in Example 1. There was thus obtained 38.3 g. of 3-methylaminotropane, B. P. 109–110° C. (23 mm.), $n_D^{25}=1.4934$.

(b) 3-(benzylmethylamino)tropane and its 8-benzochloride salt.—A mixture of 15.2 g. (0.1 mole) of 3-methylaminotropane, 12.6 g. (11.4 cc., 0.1 mole) of benzyl chloride and 13.8 g. (0.1 mole) of potassium carbonate in 100 cc. of toluene was refluxed with stirring for four hours. Ten percent aqueous potassium carbonate solution was then added whereupon three layers formed. The bottom aqueous layer was removed and discarded. The top toluene layer was separated, concentrated to dryness and the residue dissolved in ether and filtered. The filtrate was concentrated and the residue distilled, giving 5.6 g. of 3-(benzylmethylamino)tropane, B. P. 130–136° C. (0.8 mm.). The middle layer of the original three layer mixture was dissolved in chloroform, and the chloroform solution was washed with water and concentrated. The residue was dissolved in ethanol, ether was added, and the solid material (3.7 g.) which separated was collected by filtration and recrystallized from an ethanol-ether mixture, giving 3-(benzylmethylamino)tropane 8-benzochloride, M. P. 224–225.5° C. (dec.).

Analysis.—Calcd. for C$_{23}$H$_{31}$ClN$_2$: Cl, 9.56; N, 7.56. Found: Cl, 9.56; N, 7.70.

*Example 5*

3 - (benzylmethylamino)tropane 8 - (4 - nitrobenzobromide).—A solution of 2.5 g. of 3-(benzylmethylamino))tropane and 2.2 g. of p-nitrobenzyl bromide in 35 ml. of acetonitrile was kept at room temperature for about fifteen hours. The solid material which separated was collected by filtration and recrystallized first from isopropyl alcohol and then from water and dried in vacuo at 100° C. for twenty hours, giving 3-(benzylmethylamino)tropane 8-(4-nitrobenzobromide) in the form of yellow needles, M. P. 220–223° C. (dec.).

Analysis.—Calcd. for C$_{23}$H$_{30}$BrN$_3$O$_2$: Br, 17.36; N, 9.13. Found: Br, 17.21; N, 9.12.

*Example 6*

3 - (benzylmethylamino)tropane 8 - (4 - chlorobenzochloride).—A solution of 3.0 g. of 3-(benzylmethylamino)tropane and 2.0 g. of p-chlorobenzyl chloride in 25 ml. of acetonitrile was kept at room temperature for about fifteen hours. The solid product which separated was collected by filtration, recrystallized from an ethanol-ether mixture and dried at 100° C. in vacuo for twenty hours, giving 3-(benzylmethylamino)tropane 8-(4-chlorobenzochloride), M. P. 226–228° C. (dec.).

Analysis.—Calcd. for C$_{23}$H$_{30}$Cl$_2$N$_2$: Cl, 17.49; Cl (ionic), 8.75; N, 6.91. Found: Cl, 17.46; Cl (ionic), 9.10; N, 6.80.

*Example 7*

3 - (benzylmethylamino)tropane 8 - (3,4 - dichlorobenzochloride).—A solution of 4.0 g. of 3-(benzylmethylamino)tropane and 3.2 g. of 3,4-dichlorobenzyl chloride in 25 ml. of acetonitrile was warmed to the boiling point and then allowed to cool. The solid product which separated was collected by filtration, recrystallized from water and dried in vacuo for twenty hours at 100° C., giving 3-(benzylmethylamino)tropane 8-(3,4-dichlorobenzochloride), M. P. 232–235° C. (dec.).

Analysis.—Calcd. for C$_{23}$H$_{29}$Cl$_3$N$_2$: Cl (ionic), 8.06; N, 6.37. Found: Cl (ionic), 8.27; N, 6.10.

Replacement of the 3,4-dichlorobenzyl chloride in the preceding example by a molar equivalent amount of p-methoxybenzyl chloride or p-methylbenzyl chloride, yields, respectively, 3-(benzylmethylamino)tropane 8-(p-methoxybenzochloride) or 3-(benzylmethylamino)tropane 8-(p-methylbenzochloride).

*Example 8*

3-(4-chlorobenzylamino)tropane [I; R=CH$_3$, R′=H, Ar=C$_6$H$_4$Cl-4, $n=1$, $m=1$] was prepared by hydrogenation of a solution of 25.6 g. of 3-tropanone, 23.6 g. of p-chlorobenzylamine and 1 g. of platinum oxide catalyst in 200 ml. of absolute ethanol according to the manipulative procedure described above in Example 1. There was thus obtained 27.2 g. of 3-(4-chlorobenzylamino)tropane, B. P. 135–153° C. (0.2 mm.). The picrate of 3-(4-chlorobenzylamino)tropane had the M. P. 185–187° C.

A sample of 3-(4-chlorobenzylamino)tropane was converted to its phenylthioureide (R′=CSNHC$_6$H$_5$) by heating the secondary amine with a molar equivalent amount of phenylisothiocyanate. The thioureide had the M. P. 130–132° C.

Replacement of the 3-tropanone in the preceding example by a molar equivalent amount of pseudopelletierine, yields 3-(4-chlorobenzylamino)-9-methylgranatanine [R=CH$_3$, R′=H, Ar=C$_6$H$_4$Cl-4, $n=1$, $m=2$].

Replacement of the p-chlorobenzylamine in the preceding example by a molar equivalent amount of 2-phenylethylamine, 3-phenylpropylamine or 2-phenylpropylamine, yields, respectively, 3-(2-phenylethylamino)tropane [I; R=CH$_3$, R′=H, Ar=C$_6$H$_4$Cl-4, C$_n$H$_{2n}$=(CH$_2$)$_2$, $m=1$], 3 - (3 - phenylpropylamino)tropane [I; R=CH$_3$, R′=H, Ar=C$_6$H$_4$Cl-4, C$_n$H$_{2n}$=(CH$_2$)$_3$, $m=1$] or 3=(2 - phenylpropylamino)tropane [I; R=CH$_3$, R′=H, Ar=C$_6$H$_4$Cl-4, C$_n$H$_{2n}$=CH$_2$CH(CH$_3$), $m=1$].

Example 9

3-[(4-chlorobenzyl)methylamino]tropane [I; R=CH$_3$, R′=CH$_3$, Ar=C$_6$H$_4$-4, $n=1$, $m=1$] was prepared from 18.0 g. of 3-(4-chlorobenzylamino)tropane, 15 ml. of 98% formic acid and 6.85 ml. of 37% formaldehyde solution according to the manipulative procedure described above in Example 2. There was thus obtained 12.4 g. of 3-[(4-chlorobenzyl)methylamino]tropane, B. P. 140° C. (0.3 mm.).

Example 10

3 - [(4 - chlorobenzyl)methylamino]tropane 8-methiodide.—A solution of 2.84 g. of 3-[(4-chlorobenzyl)methylamino]tropane and 1.7 cc. of methyl iodide in 15 cc. of anhydrous ethanol was kept at room temperature for about five hours. The solid product which separated was collected by filtration and recrystallized from hot water, giving 1.8 g. of 3-[(4-chlorobenzyl)methylamino]tropane 8-methiodide, M. P. 255–256° C. (dec.).

*Analysis.*—Calcd. for C$_{17}$H$_{26}$ClIN$_2$: I, 30.16; N, 6.66. Found: I, 29.83; N, 6.72.

Example 11

3 - [(4 - chlorobenzyl)methylamino]tropane 8 - methobromide.—Methylbromide gas was passed through a solution of 2.5 g. of 3-[(4-chlorobenzyl)methylamino]tropane in 25 cc. of acetonitrile for ten minutes at 0° C. The reaction mixture was kept for four hours at room temperature, and the solid product which separated was collected by filtration, recrystallized from an ethanol-ether mixture and dried at 70° C., giving 3-[(4-chlorobenzyl)-methylamino]tropane 8-methobromide, M. P. 261–263° C. (dec.).

*Analysis.*—Calcd. for C$_{17}$H$_{26}$BrClN$_2$: N, 7.50; Br, 21.38. Found: N, 7.65; Br, 21.37.

Example 12

3 - [(4 - chlorobenzyl)methylamino]tropane 8 - (4-nitrobenzobromide).—A solution of 3.0 g. of 3-[(4-chlorobenzyl)methylamino]tropane and 2.6 g. of 4-nitrobenzyl bromide in 25 ml. of acetonitrile was warmed to the boiling point and then allowed to stand at room temperature for about fifteen hours. The solid product which separated was collected by filtration, recrystallized from absolute ethanol and dried at 100° C. for eight hours in vacuo, giving 2.4 g. of 3 - [(4 - chlorobenzyl)methylamino]tropane 8-(4-nitrobenzobromide), M. P. 210–212° C. (dec.).

*Analysis.*—Calcd. for C$_{23}$H$_{29}$BrClN$_3$O$_2$: Br, 16.15; N, 8.49. Found: Br, 15.80; N, 8.66.

Example 13

3-[(4 - chlorobenzyl)methylamino]tropane and its 8-(4-chlorobenzochloride) salt.—4-chlorobenzyl chloride (32.2 g.) was added to a vigorously stirred suspension of 30.4 g. of 3-methylaminotropane and 27.8 g. of potassium carbonate in 200 cc. of toluene. The reaction mixture was refluxed for four hours, cooled, and dilute potassium hydroxide solution was added. Three layers formed upon standing, and the bottom layer was removed and discarded. The top toluene layer was separated and extracted with hydrochloric acid, and the hydrochloric acid extracts were made basic and extracted with benzene. The benzene extracts were washed with water, dried over anhydrous potassium carbonate and distilled, giving 9.3 g. of 3-[(4-chlorobenzyl)methylamino]tropane, B. P. 144–146° C. (0.1–0.2 mm.), $n_D^{25}$=1.5483. The middle layer of the original three layer mixture was extracted with chloroform, and the chloroform extracts were washed with water and concentrated. The residue was recrystallized from an ethanol-ether mixture, giving 14.45 g. of 3-[(4-chlorobenzyl)methylamino]tropane 8-(4-chlorobenzochloride). A sample when recrystallized twice more from an ethanol-ether mixture and dried at 100° C. for two hours in vacuo had the M. P. 202.5–205° C. (dec.).

*Analysis.*—Calcd. for C$_{23}$H$_{29}$Cl$_3$N$_2$: Cl (ionic), 8.08. Found: Cl (ionic), 7.84.

Example 14

3-[(4 - chlorobenzyl)methylamino]tropane 8 - (3,4 - dichlorobenzochloride) was prepared from a solution of 3.0 g. of 3-[(4-chlorobenzyl)methylamino]tropane and 2.3 g. of 3,4-dichlorobenzyl chloride in 25 ml. of acetonitrile. The product which separated was collected by filtration, recrystallized from an ethanol-ether mixture and dried for eight hours in vacuo at 100° C., giving 3.3 g. of 3-[(4-chlorobenzyl)methylamino]tropane 8-(3,4-dichlorobenzochloride), M. P. 200–203° C. (dec.).

*Analysis.*—Calcd. for C$_{23}$H$_{28}$Cl$_4$N$_2$: Cl (ionic), 7.48; N, 5.91. Found: Cl (ionic), 7.04; N, 5.74.

Example 15

3-[(4-chlorobenzyl)methylamino]tropane-8-(2-hydroxyethobromide) was prepared from 3.0 g. of 3-[(4-chlorobenzyl)methylamino]tropane and 1.5 g. of 2-bromoethanol in 15 ml. of acetonitrile and 50 ml. of ether. The product separated at room temperature, and it was collected by filtration and recrystallized from isopropyl alcohol, giving 3-[(4-chlorobenzyl)methylamino]tropane 8-(2-hydroxyethobromide), M. P. 219–221° C.

*Analysis.*—Calcd. for C$_{18}$H$_{28}$BrClN$_2$O: Br. 19.78; N, 6.94. Found: Br, 19.95; N, 6.94.

Example 16

(a) 4 - diethylaminobenzylamine.—4 - diethylaminobenzaldehyde (50 g.) and 200 ml. of a 12% solution of ammonia in methanol was hydrogenated in the presence of Raney nickel catalyst for three hours at 21–22° C. at an initial pressure of 890 lbs. per sq. inch. The reaction mixture was filtered, the filtrate was concentrated and the residue was distilled, giving 41.1 g., B. P. 132–150° C. (2–3 mm.). This product was redistilled giving 23.2 g. of 4-diethylaminobenzylamine, B. P. 122–128° C. (0.1 mm.), $n_D^{25}$=1.5592.

(b) 3-(4 - diethylaminobenzylamino)tropane trihydrochloride dihydrate [I; R=CH$_3$, R′=H,

Ar=C$_6$H$_4$N(C$_2$H$_5$)$_2$-4

$n=1$, $m=1$] was prepared by hydrogenation of 19.0 g. of 3-tropanone, 23.2 g. of 4-diethylaminobenzylamine and 1 g. of platinum oxide catalyst in 200 ml. of absolute ethanol according to the manipulative procedure described above in Example 1. The crude basic product (26 g.) was dissolved in 100 ml. of absolute ethanol and an excess of alcoholic hydrogen chloride was added. The solid material which separated was collected by filtration and recrystallized from methanol, giving 21.5 g. of 3-(4-diethylaminobenzylamino)tropane trihydrochloride dihydrate, M. P. about 195° C. (dec.).

Analysis.—Calcd. for $C_{19}H_{31}N_3 \cdot 3HCl \cdot 2H_2O$: $H_2O$, 8.06; N, 9.40; Cl, 23.8. Found: $H_2O$, 8.59; N, 9.40; Cl, 23.8.

The picrate of 3-(4-diethylaminobenzylamino)tropane was prepared from the free base and a solution of picric acid in absolute ethanol. The picrate was recrystallized from 95% ethanol and had the M. P. 185° C. (dec.).

The phenylthioureide of 3-(4-diethylaminobenzylamino)tropane was prepared by treating a sample of the trihydrochloride salt with an excess of sodium bicarbonate solution, and boiling the resulting free base with phenylisothiocyanate and alcohol. The thioureide had the M. P. 145–147° C.

Analysis.—Calcd. for $C_{26}H_{36}N_4S$: S, 7.34; N, 12.83. Found: S, 7.85; N, 12.72.

Example 17

3 - (4 - diethylaminobenzylamino)tropane 8 - methiodide.—A solution of 3.0 g. of 3-(4-diethylaminobenzylamino)tropane (prepared by neutralization of the trihydrochloride salt obtained above in Example 16) and 0.7 cc. of methyl iodide in 30 cc. of absolute ether was kept at room temperature for about fifteen hours. The solid product which separated was collected by filtration, recrystallized from isopropyl alcohol and dried at 75° C. for five hours in vacuo, giving 3-(4-diethylaminobenzylamino)tropane 8-methiodide, M. P. 240–245° C. (dec.).

Analysis.—Calcd. for $C_{20}H_{34}IN_3$: I, 28.6; N, 9.49. Found: I, 28.3; N, 9.42.

Example 18

3-(4-diethylaminobenzylamino)tropane 8 - (4 - chlorobenzochloride).—A solution of 3.0 g. of 3-(4-diethylaminobenzylamino)tropane and 1.7 g. of p-chlorobenzyl chloride in 25 ml. of acetonitrile was boiled for thirty minutes and then allowed to stand at room temperature for about fifteen hours. The solid product which separated was collected by filtration, recrystallized from an ethanol-ether mixture and dried at 75° C. in vacuo for eight hours, giving 2.6 g. of 3-(4-diethylaminobenzylamino)tropane 8 - (4 - chlorobenzochloride), M. P. 208–211° C. (dec.).

Analysis.—Calcd. for $C_{26}H_{37}Cl_2N_3$: Cl (ionic), 7.67; N, 9.09. Found: Cl (ionic), 7.44; N, 9.12.

Example 19

3-(4-diethylaminobenzylamino)tropane 8-(3,4 - dichlorobenzochloride).—A solution of 3.0 g. of 3-(4-diethylaminobenzylamino)tropane and 2.0 g. of 3,4-dichlorobenzyl chloride in 25 ml. of acetonitrile was boiled for thirty minutes and then allowed to stand at room temperature for about fifteen hours. The product which separated was collected by filtration, recrystallized from an ethanol-ether mixture and dried at 75° C. for eight hours in vacuo, giving 3.3 g. of 3-(4-diethylaminobenzylamino)tropane 8-(3,4-dichlorobenzochloride), M. P. 200–203° C. (dec.).

Analysis.—Calcd. for $C_{26}H_{36}Cl_3N_3$: Cl (ionic), 7.14; N, 8.46. Found: Cl (ionic), 7.02; N, 8.47.

Example 20

3-(4-diethylaminobenzylamino)tropane 8-(4-nitrobenzobromide) was prepared from 3.0 g. of 3-(4-diethylaminobenzylamino)tropane and 2.2 g. of 4-nitrobenzyl bromide in 25 ml. of acetonitrile. The product was recrystallized first from absolute isopropyl alcohol and then from acetonitrile and dried at 78° C. for five hours in vacuo, giving 3-(4-diethylaminobenzylamino)tropane 8-(4-nitrobenzobromide), M. P. 189–191° C.

Example 21

(a) 3-(benzylacetylamino)tropane can be prepared by heating 3-benzylaminotropane (prepared as described above in Example 1) with acetic anhydride, hydrolyzing the reaction mixture, extracting with ether and distilling the product.

(b) 3 - (benzylethylamino)tropane [I; R=CH₃, R'=C₂H₅, Ar=C₆H₅, n=1, m=1] can be prepared by heating 3-(benzylacetylamino)tropane with a suspension of lithium aluminum hydride in anhydrous ether, hydrolyzing the reaction mixture, and extracting and distilling the product.

Example 22

(a) 8-phenylnortropanone.—A solution was prepared from 36.2 g. of 2,5-diethoxytetrahydrofuran in 240 cc. of water containing 0.6 ml. of concentrated sulfuric acid. A second solution was prepared from 97 g. of acetonedicarboxylic acid, 146 g. of sodium acetate trihydrate and 27 g. of aniline in 3.5 liters of water. The first solution was warmed on a steam bath for fifteen minutes, cooled and added to the second solution. The reaction mixture was kept overnight, and the solid which separated was collected by filtration and dissolved in 1 liter of 5% hydrochloric acid at 60° C. The solution was cooled, made basic with ammonia and the product collected by filtration and recrystallized from dilute methanol, giving 11.4 g. of 8-phenylnortropanone, M. P. 107–109° C.

(b) 3-benzylamino-8-phenylnortropanone [I; R=C₆H₅, R'=H, Ar=C₆H₅, n=1, m=1] can be prepared by hydrogenation of a mixture of 8-phenylnortropanone and benzylamine in ethanol solution in the presence of platinum oxide catalyst according to the manipulative procedure described above in Example 1.

Illustrative of the physiological activity of the compounds of the invention are the following data: 3-(benzylmethylamino)tropane 8-benzochloride, 3-(benzylmethylamino)tropane 8-(4-nitrobenzobromide), 3-(benzylmethylamino)tropane 8-(4-chlorobenzochloride), 3-(benzylmethylamino)tropane 8-(3,4-dichlorobenzochloride), 3-[(4 - chlorobenzyl)methylamino]tropane 8 - methiodide, and 3-[(4-chlorobenzyl)methylamino]tropane 8-(4-chlorobenzochloride) were found to be 60%, 54%, 74%, 128%, 30% and 100% as effective, respectively, as hexamethylene-bis(trimethylammonium bromide) (hexamethonium) in blockade of the sympathetic ganglia when measured by the carotid occlusion test in dogs. 3-[(4-chlorobenzyl)methylamino]tropane 8-methiodide, 3-(4-diethylaminobenzylamino)tropane 8-methiodide, and 3-(4-diethylaminobenzylamino)tropane 8-(4-chlorobenzochloride) were found to be 35%, 26% and 210% as effective, respectively, as hexamethonium in blockade of the sympathetic ganglia when measured by the carotid occlusion test in cats. The compounds can be prepared for use as ganglionic blocking agents by means similar to those employed for conventional ganglionic blocking agents such as hexamethonium salts.

I claim:

1. A compound selected from the group consisting of (A) cycloalkanes having an N-substituted 1,5-imino bridge and a (monocarbocyclic aryl-lower-alkyl)amino group attached to the 3-position of the cycloalkane ring, the cycloalkane ring having from seven to eight ring members, and the monocarbocyclic aryl radical being selected from the group consisting of phenyl and phenyl substituted by from 1 to 3 substituents selected from the group consisting of lower-alkyl, lower-alkoxy, halogen and di-lower-alkylamino groups, (B) acid-addition salts, and (C) quaternary ammonium salts thereof.

2. A quaternary ammonium salt of a cycloalkane having an N-substituted 1,5-imino bridge and a (phenyl-lower-alkyl)amino group attached to the 3-position of the cycloalkane ring, the cycloalkane ring having from seven to eight ring members.

3. A quaternary ammonium salt of a compound having the formula

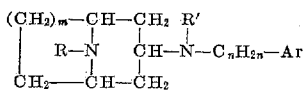

wherein Ar is the phenyl group, R' is hydrogen, R is a lower-alkyl group, m is an integer from 1 to 2, and n is an integer from 1 to 6.

4. A quaternary ammonium salt of a compound having the formula

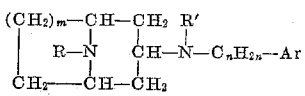

wherein Ar is the phenyl group, R' is a lower-alkyl group, R is a lower-alkyl group, m is an integer from 1 to 2, and n is an integer from 2 to 6.

5. A quaternary ammonium salt of a compound having the formula

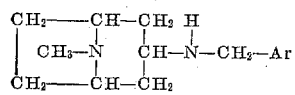

wherein Ar is the phenyl group.

6. A quaternary ammonium salt of a compound having the formula

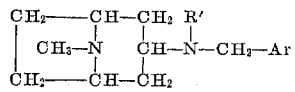

wherein Ar is the phenyl group, and R' is a lower-alkyl group.

7. A quaternary ammonium salt of a compound having the formula

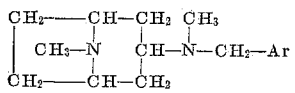

wherein Ar is the phenyl group.

8. A quaternary ammonium salt of 3-benzylaminotropane.

9. A quaternary ammonium salt of 3-(4-chlorobenzylamino)tropane.

10. A quaternary ammonium salt of 3-(4-diethylaminobenzylamino)tropane.

11. A quaternary ammonium salt of 3-(benzylmethylamino)tropane.

12. A quaternary ammonium salt of 3-[(4-chlorobenzyl)methylamino]tropane.

13. In the process for preparing a cycloalkane having an N-substituted 1,5-imino bridge and a (monocarbocyclic aryl-lower-alkyl)amino group attached to the 3-position of the cycloalkane ring, the cycloalkane ring having from seven to eight ring members, and the monocarbocyclic aryl radical being selected from the group consisting of phenyl and phenyl substituted by from 1 to 3 substituents selected from the group consisting of lower-alkyl, lower-alkoxy, halogen and di-lower-alkylamino groups, the step which comprises treating an N-substituted 1,5-iminocycloalkane-3-one with a (monocarbocyclic aryl-lower-alkyl)amine under catalytic hydrogenation conditions.

14. The process for preparing a compound having the formula

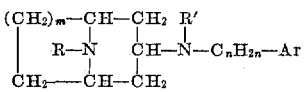

wherein Ar is the phenyl group, R is a lower-alkyl group, R' is methyl, n is an integer from 1 to 6, and m is an integer from 1 to 2, which comprises treating the compound wherein R' is hydrogen with formic acid and formaldehyde.

15. A process for preparing a quaternary ammonium salt of a cycloalkane having an N-substituted 1,5-imino bridge and a (phenyl-lower-alkyl)amino group attached to the 3-position of the cycloalkane ring, the cycloalkane ring having from seven to eight ring members, which comprises treating said cycloalkane with a member of the group consisting of lower-alkyl, hydroxy-lower-alkyl, and monocarbocyclic aryl-lower-alkyl esters of strong acids.

16. 3 - (4 - diethylaminobenzylamino)tropane 8-methiodide.

17. 3 - (benzylmethylamino)tropane 8-(3,4-dichlorobenzochloride).

18. 3 - [(4 - chlorobenzyl)methylamino]tropane 8-(4-chlorobenzochloride).

19. In the process for preparing a compound having the formula

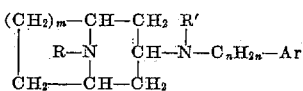

wherein Ar is the phenyl group, R' is hydrogen, R is a lower-alkyl group, m is an integer from 1 to 2, and n is an integer from 1 to 6, the step which comprises treating a compound having the formula

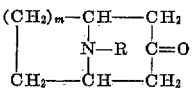

with a compound of the formula $H_2N$—$C_nH_{2n}$—Ar under catalytic hydrogenation conditions.

20. In the process for preparing 3-benzylaminotropane, the step which comprises treating 3-tropanone with benzylamine under catalytic hydrogenation conditions.

21. In the process for preparing 3-(4-chlorobenzylamino)tropane, the step which comprises treating 3-tropanone with 4-chlorobenbylamine under catalytic hydrogenation conditions.

22. In the process for preparing 3-(4-diethylaminobenzylamino)tropane, the step which comprises treating 3-tropanone with 4-diethylaminobenzylamine under catalytic hydrogenation conditions.

23. The process for preparing 3-(benzylmethylamino)tropane, which comprises treating 3-benzylaminotropane with formic acid and formaldehyde.

24. The process for preparing 3-[(4-chlorobenzyl)methylamino]tropane, which comprises treating 3-(4-chlorobenzylamino)tropane with formic acid and formaldehyde.

25. The process for preparing 3-(4-diethylaminobenzylamino)tropane 8-methiodide, which comprises treating 3-(4-diethylaminobenzylamino)tropane with methyl iodide.

26. The process for preparing 3-(benzylmethylamino)tropane 8-(3,4-dichlorobenzochloride), which comprises treating 3-(benzylmethylamino)tropane with 3,4-dichlorobenzyl chloride.

27. The process for preparing 3-[(4-chlorobenzyl)methylamino]tropane 8-(4-chlorobenzochloride), which comprises treating 3-[(4-chlorobenzyl)methylamino]tropane with 4-chlorobenzyl chloride.

References Cited in the file of this patent

UNITED STATES PATENTS 2,678,317     Payne et al.     May 11, 1954

UNITED STATES PATENT OFFICE
Certificate of Correction

Patent No. 2,798,874  July 9, 1957

Sydney Archer

It is hereby certified that error appears in the printed specification of the above numbered patent requiring correction and that the said Letters Patent should read as corrected below.

Column 1, line 42, for "monocarboxylic" read —monocarbocyclic—; column 2, line 2, for "carboxylic" read —carbocyclic—; column 10, line 30, for "*3-benzylamino-8-phenylnortropanone*" read —*3-benzylamino-8-phenylnortropane*—; column 12, line 42, for "4-chlorobenbylamine" read —4-chlorobenzylamine—.

Signed and sealed this 27th day of August 1957.

[SEAL]

Attest:
KARL H. AXLINE,
*Attesting Officer.*

ROBERT C. WATSON,
*Commissioner of Patents.*